US012404416B2

United States Patent
Yoda et al.

(10) Patent No.: US 12,404,416 B2
(45) Date of Patent: Sep. 2, 2025

(54) RADIATION-CURABLE INK JET COMPOSITION AND INK JET PRINTING APPARATUS

(71) Applicant: SEIKO EPSON CORPORATION, Tokyo (JP)

(72) Inventors: Toshiyuki Yoda, Matsumoto (JP); Kyohei Tanaka, Sagamihara (JP); Midori Sekine, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 316 days.

(21) Appl. No.: 18/074,836

(22) Filed: Dec. 5, 2022

(65) Prior Publication Data

US 2023/0174809 A1    Jun. 8, 2023

(30) Foreign Application Priority Data

Dec. 6, 2021 (JP) .................................. 2021-197582

(51) Int. Cl.
*C09D 11/38* (2014.01)
*B41J 2/01* (2006.01)
(Continued)

(52) U.S. Cl.
CPC ................. *C09D 11/38* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 2010/0233448 A1* | 9/2010 | Kameyama .......... | C09D 11/324 524/853 |
| 2013/0010039 A1* | 1/2013 | Kida .................... | C09D 11/322 522/167 |

(Continued)

FOREIGN PATENT DOCUMENTS

| | | |
|---|---|---|
| CN | 109971252 A | 7/2019 |
| JP | 2007-038604 A | 2/2007 |

(Continued)

*Primary Examiner* — Manish S Shah
(74) *Attorney, Agent, or Firm* — Harness, Dickey & Pierce, P.L.C.

(57) ABSTRACT

A radiation-curable ink jet composition used in an ink jet printing apparatus including an ink jet head using a material with an SP value of 7.0 $(J/cm^3)^{1/2}$ to 8.0 $(J/cm^3)^{1/2}$ in a flow path is provided. The radiation-curable ink jet composition contains polymerizable monomers A including at least one polymerizable monomer B with an SP value of 7.0 $(J/cm^3)^{1/2}$ or less or 8.0 $(J/cm^3)^{1/2}$ or more and at least one polymerizable monomer C with an SP value of more than 7.0 $(J/cm^3)^{1/2}$ to less than 8.0 $(J/cm^3)^{1/2}$. The amount of the at least one polymerizable monomer B is 20% by mass or more relative to the total mass of the ink jet composition, and the amount of the at least one polymerizable monomer C is 22.5% by mass or less relative to the total mass of the ink jet composition.

10 Claims, 1 Drawing Sheet

(51) Int. Cl.
  *B41J 2/21* (2006.01)
  *C09D 11/101* (2014.01)
  *C09D 11/30* (2014.01)
  *C09D 11/322* (2014.01)
(52) U.S. Cl.
  CPC ............ *C09D 11/101* (2013.01); *C09D 11/30* (2013.01); *C09D 11/322* (2013.01)
(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 2013/0295342 A1* | 11/2013 | Araki | C09D 11/30 522/167 |
| 2017/0233594 A1* | 8/2017 | Yoda | C09D 11/326 347/102 |
| 2017/0252971 A1* | 9/2017 | Umebayashi | C09D 11/40 |
| 2017/0368819 A1* | 12/2017 | Kagata | C09D 11/38 |
| 2018/0244933 A1* | 8/2018 | Tsuchiya | B41J 11/00214 |
| 2018/0257387 A1 | 9/2018 | Nakano et al. | |
| 2021/0301158 A1* | 9/2021 | Koike | B41J 2/2107 |
| 2021/0301162 A1 | 9/2021 | Nakamura et al. | |

FOREIGN PATENT DOCUMENTS

| | | |
|---|---|---|
| JP | 2018-009074 A | 1/2018 |
| JP | 2021-155465 A | 10/2021 |

\* cited by examiner

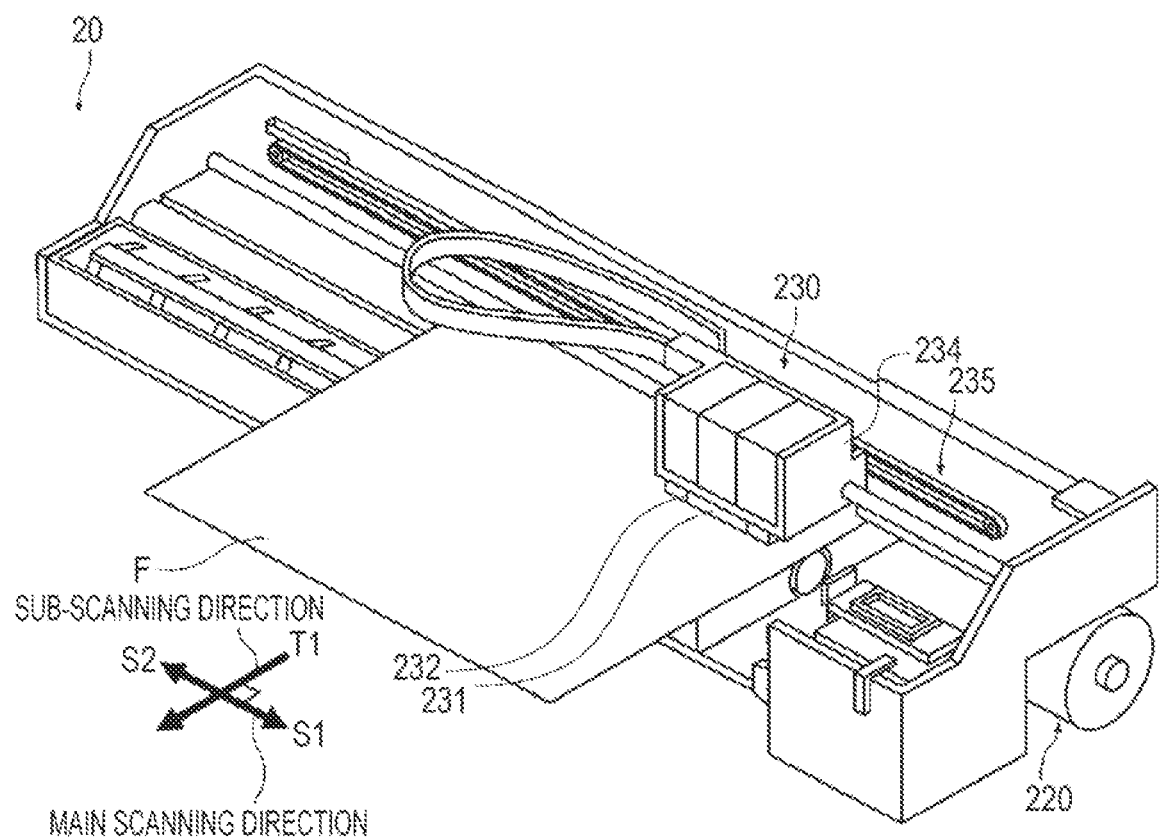

RADIATION-CURABLE INK JET COMPOSITION AND INK JET PRINTING APPARATUS

The present application is based on, and claims priority from JP Application Serial Number 2021-197582, filed Dec. 6, 2021, the disclosure of which is hereby incorporated by reference herein in its entirety.

BACKGROUND

1. Technical Field

The present disclosure relates to a radiation-curable ink jet composition and an ink jet printing apparatus.

2. Related Art

Ink jet printing methods, which enable high-definition image printing with a relatively simple apparatus, have been rapidly developed in various fields. In particular, various radiation-curable inks have been being studied. For example, JP-A-2018-009074 discloses an active energy ray-curable composition containing one or more alicyclic structure-containing monofunctional monomers, one or more alicyclic structure-containing bifunctional monomers in a proportion of 10 to 50 parts by weight relative to 100 parts by weight of all monomers, chlorinated polypropylene, and one or more polyester structure-containing polymers for the purpose of providing an active energy ray-curable composition that exhibits good adhesion to propylene and polyethylene terephthalate base materials and can form highly strong coatings.

JP-A-2018-009074 discloses Examples using isobornyl acrylate in a large proportion, for example, 70% by mass or more, as the alicyclic structure-containing monofunctional monomer. Isobornyl acrylate increases the adhesion of the coating of the composition to polypropylene and other non-absorbent base materials but can swell materials used in the ink jet head, depending on the material, and induce the degradation of ejection consistency.

SUMMARY

According to an aspect of the present disclosure, a radiation-curable ink jet composition used in an ink jet printing apparatus including an ink jet head using a material with an SP value of 7.0 $(J/cm^3)^{1/2}$ to 8.0 $(J/cm^3)^{1/2}$ in a flow path is provided. The radiation-curable ink jet composition contains polymerizable monomers A including at least one polymerizable monomer B with an SP value of 7.0 $(J/cm^3)^{1/2}$ or less or 8.0 $(J/cm^3)^{1/2}$ or more and at least one polymerizable monomer C with an SP value of more than 7.0 $(J/cm^3)^{1/2}$ to less than 8.0 $(J/cm^3)^{1/2}$. The amount of the at least one polymerizable monomer B is 20% by mass or more relative to the total mass of the ink jet composition, and the amount of the at least one polymerizable monomer C is 22.5% by mass or less relative to the total mass of the ink jet composition.

The present disclosure also provides an ink jet printing apparatus including an ink jet head using a material with an SP value of 7.0 $(J/cm^3)^{1/2}$ to 8.0 $(J/cm^3)^{1/2}$ in a flow path, and the above-described radiation-curable ink jet composition. The ink jet composition is ejected from the ink jet head.

BRIEF DESCRIPTION OF THE DRAWING

The FIGURE is a perspective view of a serial ink jet printing apparatus according to an embodiment of the present disclosure.

DESCRIPTION OF EXEMPLARY EMBODIMENTS

Some embodiments of the present disclosure will now be described in detail with reference to the drawings as needed. However, the implementation of the concept of the disclosure is not limited to the embodiments disclosed herein, and various modifications may be made without departing from the scope and spirit of the disclosure. The same elements in the drawings are designated by the same reference numerals, and thus description thereof is omitted. The vertical, lateral, and other positional relationships are in accordance with the drawing unless otherwise specified. The dimensional proportions in the drawing are not limited to those illustrated in the drawing.

In the description disclosed herein, "(meth)acryloyl" refers to at least either acryloyl or methacryloyl; "(meth)acrylate" refers to at least either an acrylate or the corresponding methacrylate; and a "(meth)acrylic" compound refers to at least either an acrylic compound or the corresponding methacrylic compound.

1. Radiation-Curable Ink Jet Composition

The radiation-curable ink jet composition (hereinafter also simply referred to as the ink jet composition) disclosed herein is used in an ink jet printing apparatus including an ink jet head using a material with an SP value of 7.0 $(J/cm^3)^{1/2}$ to 8.0 $(J/cm^3)^{1/2}$ in a flow path. The radiation-curable ink jet composition contains polymerizable monomers A including at least one polymerizable monomer B with an SP value of 7.0 $(J/cm^3)^{1/2}$ or less or 8.0 $(J/cm^3)^{1/2}$ or more and at least one polymerizable monomer C with an SP value of more than 7.0 $(J/cm^3)^{1/2}$ to less than 8.0 $(J/cm^3)^{1/2}$. The polymerizable monomer B content is 20% by mass or more relative to the total mass of the ink jet composition, and the polymerizable monomer C content is 22.5% by mass or less relative to the total mass of the ink jet composition.

The ink jet composition containing such a specific amount of polymerizable monomer(s) B reduces the likelihood of, for example, swelling materials of the flow path when flowing through the flow path. Accordingly, the ink jet composition is less likely to affect the durability of materials in the flow path even when printed using an ink jet printing apparatus including an ink jet head using a material with an SP value of 7.0 $(J/cm^3)^{1/2}$ to 8.0 $(J/cm^3)^{1/2}$ in the flow path. Also, unlikelihood of affecting material durability leads to increased ejection consistency.

Furthermore, the ink jet composition containing the above-mentioned specific amount of polymerizable monomer(s) C can exhibit increased adhesion to polypropylene and other non-absorbent base materials.

The radiation-curable ink jet composition disclosed herein may optionally contain an oligomer, a polymerization initiator, a polymerization inhibitor, a surfactant, a coloring material, and other additives.

The radiation-curable ink jet composition disclosed herein is used by being ejected from an ink jet head by an ink jet method. In the following embodiments, a radiation-curable ink composition will be described as an implementation of the radiation-curable ink jet composition. However, the radiation-curable ink jet composition disclosed herein may be used for three-dimensional (3D) fabrication without being limited to use as an ink composition.

The radiation-curable ink jet composition is cured by irradiation with radiation. The radiation may be ultraviolet light, an electron beam, infrared light, visible light, or X rays. In some embodiments, ultraviolet light is used as the radiation because of the prevalence and availability of the radiation source and the materials suitable for curing with UV light.

The constituents, physical properties, and preparation method of the radiation-curable ink jet composition according to an embodiment will now be described.

1. 1. Polymerizable Monomers A

In the description of the present disclosure, compounds containing a polymerizable unsaturated bond are collectively referred to as polymerizable monomers A. When the polymerizable monomers A are defined in terms of the number of functional groups, each polymerizable monomer A is either a monofunctional monomer A1 with one polymerizable functional group or a multifunctional monomer A2 with a plurality of polymerizable functional groups. When the polymerizable monomers A are defined in terms of the SP value calculated from Small's equation, each polymerizable monomer A is either a polymerizable monomer B with an SP value of 7.0 $(J/cm^3)^{1/2}$ or less or 8.0 $(J/cm^3)^{1/2}$ or more or a polymerizable monomer C with an SP value of more than 7.0 $(J/cm^3)^2$ to less than 8.0 $(J/cm^3)^{1/2}$.

In the following description, monofunctional monomers A1 and multifunctional monomers A2 will first be described, followed by polymerizable monomers B and C.

The term "SP value" used herein is also referred to as solubility parameter and is calculated using the following Small's equation:

$$\sigma = \rho \cdot (\Sigma Fi)/M$$

wherein $\sigma$ represents the SP value, $\rho$ represents the density, Fi represents the molar attraction constant, and M represents the molecular weight of the monomer (compound).

The average of the SP values of the polymerizable monomers A weighted by the proportions by mass of the polymerizable monomers A may be 7.5 $(J/cm^3)^{1/2}$ to 11 $(J/cm^3)^{1/2}$, for example, 8.0 $(J/cm^3)^{1/2}$ to 10.5 $(J/cm^3)^{1/2}$ or 8.5 $(J/cm^3)^{1/2}$ to 10 $(J/cm^3)^{1/2}$. When the weighted average SP value of the polymerizable monomers A is in such a range, the coating of the ink jet composition tends to be highly adhesive, and the ink jet composition is less likely to affect material durability. The weighted average SP value can be calculated similarly to the weighted average glass transition temperature described later herein.

Incidentally, the average glass transition temperature of the homopolymers of the polymerizable monomers A, weighted by the proportions by mass of the individual polymerizable monomers A may be 25° C. to 40° C., for example, 27.5° C. to 37.5° C. or 30° C. to 35° C. When the weighted average glass transition temperature is in such a range, the bendability of the coating tends to be improved.

The weighted average glass transition temperature of the homopolymers can be controlled by the glass transition temperatures of the homopolymers of polymerizable monomers to be used and the proportions by mass of the polymerizable monomers.

It will now be explained how to calculate the weighted average glass transition temperature of the homopolymers of polymerizable monomers A. The weighted average glass transition temperature of the homopolymers is represented by $Tg_{All}$, the glass transition temperature of a polymerizable monomer is represented by $Tg_N$, and the proportion by mass of the polymerizable monomer is represented by $X_N$ (wt %). N is a variable from 1 to the number of polymerizable monomers in the radiation-curable ink jet composition, assigned in turn. For example, when three polymerizable monomers are used, the glass transition temperatures of their homopolymers are $Tg_1$, $Tg_2$, and $Tg_3$. The weighted average glass transition temperature $Tg_{All}$ of homopolymers is the sum of the products of the glass transition temperature $Tg_N$ of the homopolymer of each polymerizable monomer and the proportion $X_N$ by mass of the polymerizable monomer. Thus, the following equation (1) holds.

$$Tg_{All} = \Sigma Tg_N \cdot X_N \quad (1)$$

The glass transition temperature of the homopolymer of a polymerizable monomer can be measured by differential scanning calorimetry (DSC) in accordance with JIS K 7121. More specifically, a sample prepared by polymerizing a monomer to the extent that its homopolymer exhibits a constant transition temperature is measured with a measurement apparatus, for example, Model DSC6220 manufactured by Seiko Instruments Inc.

The polymerizable monomer A content may be 75% to 85% by mass, for example, 70% to 90% by mass or 65% to 95% by mass, relative to the total mass of the ink jet composition. The use of polymerizable monomers A in such a proportion tends to increase the adhesion of the coating and reduce the likelihood that the ink jet composition affects material durability.

1. 1. 1. Monofunctional Monomers A1

Examples of monofunctional monomer A1 include, but are not limited to, alicyclic structure-containing monofunctional monomers, nitrogen-containing monofunctional monomers, aromatic group-containing monofunctional monomers, and urethane acrylates. Optionally, one or more of such monofunctional monomers may be replaced with other monofunctional monomers, or the monofunctional monomers may include other monofunctional monomers. Such a monofunctional monomer may be, but is not limited to, a known monofunctional monomer having a polymerizable functional group, particularly a polymerizable functional group with a carbon-carbon unsaturated double bond.

One or more monofunctional monomers A1 may be used in a proportion of 50% to 80% by mass by mass, for example, 55% to 75% by mass or 60% to 70% by mass, relative to the total mass of the polymerizable monomers A. The use of monofunctional monomers A1 in a proportion of 50% by mass or more tends to increase the adhesion, bendability, and rub resistance of the coating. Also, limiting the proportion of the monofunctional monomers A1 to 80% by mass or less tends to increase the anti-blocking property of the coating and reduce the likelihood that the ink jet composition affects material durability.

The following are examples of monofunctional monomers, but the monofunctional monomers used in the embodiments of the present disclosure are not limited to the following examples.

1. 1. 1. 1. Alicyclic Structure-Containing Monofunctional Monomers

Exemplary alicyclic structure-containing monofunctional monomers include, but are not limited to, monocyclic hydrocarbon-containing monomers, such as tert-butylcyclohexanol (meth)acrylate (TBCHA), 3,3,5-trimethylcyclohexyl (meth)acrylate (TMCHA), and 1,4-dioxaspiro[4.5]dec-2-yl-methyl 2-(meth)acrylate; unsaturated polycyclic hydrocarbon-containing monomers, such as dicyclopentenyl (meth) acrylate and dicyclopentenyloxyethyl (meth)acrylate; and saturated polycyclic hydrocarbon-containing monomers, such as dicyclopentanyl (meth)acrylate and isobornyl (meth)acrylate (IBXA).

In some embodiments, isobornyl (meth)acrylate, tert-butylcyclohexanol acrylate, or trimethylcyclohexyl (meth)acrylate may be used, particularly isobornyl acrylate. Such alicyclic structure-containing monofunctional monomers tend to increase the adhesion, rub resistance, bendability, and anti-blocking property of the coating.

The isobornyl (meth)acrylate content may be 5.0% to 20% by mass, for example, 10% to 20% by mass or 12.5% to 17.5% by mass, relative to the total mass of the ink jet composition. The use of 5.0% by mass or more of isobornyl (meth)acrylate tends to further increase the adhesion of the coating. Also, limiting the isobornyl (meth)acrylate content to 20% by mass or less tends to increase the anti-blocking property of the coating and reduce the likelihood that the ink jet composition affects material durability.

Also, the alicyclic structure-containing monofunctional monomer content may be 5.0% to 20% by mass, for example, 10% to 20% by mass or 12.5% to 17.5% by mass, relative to the total mass of the ink jet composition. The use of one or more alicyclic structure-containing monofunctional monomers in a proportion of 5.0% by mass or more tends to increase the adhesion of the coating. Also, limiting the alicyclic structure-containing monofunctional monomer content to 20% by mass or less tends to increase the anti-blocking property of the coating and reduce the likelihood that the ink jet composition affects material durability.

1. 1. 1. 2. Nitrogen-Containing Monofunctional Monomers

Examples of nitrogen-containing monofunctional monomers include, but are not limited to, nitrogen-containing monofunctional vinyl monomers, such as N-vinylcaprolactam, N-vinylformamide, N-vinylcarbazole, N-vinylacetamide, vinyl methyl oxazolidinone, and N-vinylpyrrolidone; nitrogen-containing monofunctional acrylate monomers, such as acryloylmorpholine (ACMO); and nitrogen-containing monofunctional (meth)acrylamide monomers, such as (meth)acrylamide, N-(hydroxymethyl) (meth)acrylamide, diacetone acrylamide, N,N-dimethyl (meth)acrylamide, and dimethylaminoethyl acrylate benzyl chloride quaternary salt.

In some embodiments, the ink jet composition may contain any of those nitrogen-containing monofunctional vinyl monomers and nitrogen-containing monofunctional acrylate monomers, particularly, a monomer having a nitrogen-containing heterocyclic structure, such as N-vinylcaprolactam, N-vinylcarbazole, N-vinylpyrrolidone, vinyl methyl oxazolidinone, or acryloylmorpholine. In many embodiments, acryloylmorpholine or vinyl methyl oxazolidinone may be used.

Such nitrogen-containing monofunctional monomers tend to further increase the rub resistance of the coating. Additionally, nitrogen-containing monofunctional acrylate monomers having a nitrogen-containing heterocyclic structure, such as acryloylmorpholine, tend to further increase the adhesion of the coating.

The nitrogen-containing monofunctional monomer content may be 1.0% to 15% by mass, for example, 2.0% to 12% by mass or 3.0% to 10% by mass, relative to the total mass of the ink jet composition. The use of one or more nitrogen-containing monofunctional monomers in such a range tends to further increase the rub resistance and adhesion of the coating.

1. 1. 1. 3. Aromatic Group-Containing Monofunctional Monomers

Examples of aromatic group-containing monofunctional monomers include, but are not limited to, phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, EO-modified p-cumylphenol (meth)acrylate, and 2-hydroxy-3-phenoxypropyl (meth)acrylate.

Among these, phenoxyethyl (meth)acrylate and benzyl (meth)acrylate are beneficial. In some embodiments, phenoxyethyl (meth)acrylate, particularly phenoxyethyl acrylate (PEA), may be used. Such aromatic group-containing monofunctional monomers tend to further increase the solubility of the photopolymerization initiator and facilitate the curability of the ink jet composition. In particular, the solubility of acylphosphine oxide-based photopolymerization initiators and thioxanthone-based photopolymerization initiators tends to be increased.

The aromatic group-containing monofunctional monomer content may be 12.5% to 35% by mass, for example, 15% to 30% by mass or 17.5% to 25% by mass, relative to the total mass of the ink jet composition. The use of one or more aromatic group-containing monofunctional monomers in such a range tends to further increase the rub resistance and adhesion of the coating.

1. 1. 1. 4. Urethane Acrylate

Urethane acrylate is (meth)acrylate ester containing a urethane linkage and otherwise not limited, and examples include (methylcarbamoyloxy)ethyl (meth)acrylate, (ethylcarbamoyloxy)ethyl (meth)acrylate, (propylcarbamoyloxy)ethyl (meth)acrylate, (butylcarbamoyloxy)ethyl (meth)acrylate (MUA), (methylcarbamoyloxy)ethoxyethyl (meth)acrylate, (ethylcarbamoyloxy)ethoxyethyl (meth)acrylate, (propylcarbamoyloxy)ethoxyethyl (meth)acrylate, and (butylcarbamoyloxy)ethoxyethyl (meth)acrylate. Such urethane acrylates tend to further increase the adhesion of the coating.

The urethane acrylate content may be 1.0% to 15% by mass, for example, 2.0% to 12% by mass or 3.0% to 10% by mass, relative to the total mass of the ink jet composition. The use of urethane acrylates in such a range tends to further increase the adhesion of the coating.

1. 1. 2. Multifunctional Monomers A2

The polymerizable monomers A may include one or more multifunctional monomers A2. Examples of multifunctional monomers A2 include, but are not limited to, vinyl group-containing (meth)acrylates and multifunctional (meth)acrylates. Other multifunctional monomers may be used.

The multifunctional monomer A2 content may be 10% by mass or more, for example, 15% by mass or more, 20% by mass or more, or 25% by mass or more, relative to the total mass of the ink jet composition. Also, the multifunctional monomer A2 content may be 45% by mass or less, for example, 40% by mass or less or 35% by mass or less, relative to the total mass of the ink jet composition. The use of one or more multifunctional monomers A2 in a proportion of 10% by mass or more tends to increase the anti-blocking property and rub resistance of the coating and reduce the likelihood that the ink jet composition affects material durability. Limiting the multifunctional monomer A2 content to 45% by mass or less tends to increase the adhesion and bendability of the coating.

The following are examples of multifunctional monomers A2, but the multifunctional monomers used in the embodiments of the present disclosure are not limited to the following examples.

1. 1. 2. 1. Vinyl Group-Containing (Meth)Acrylate

Examples of vinyl group-containing (meth)acrylate include, but are not limited to, the compounds represented by the following formula (I):

$$H_2C=CR^1-CO-OR^2-O-CH=CH-R^3 \quad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

Such a vinyl group-containing (meth)acrylate tend to reduce the viscosity of the ink jet composition, consequently improving the ejection consistency of the ink jet composition. Also, the curability of the ink jet composition can be further increased, and increased curability results in increased printing speed.

In formula (I), the divalent organic residue with 2 to 20 carbon atoms represented by $R^2$ may be a substituted or unsubstituted linear, branched, or cyclic alkylene group with 2 to 20 carbon atoms, a substituted or unsubstituted alkylene group with 2 to 20 carbon atoms having an oxygen atom of an ether bond and/or an ester bond in the molecular structure thereof, or a substituted or unsubstituted divalent aromatic group with 6 to 11 carbon atoms. In some embodiments, $R^2$ is an alkylene group with 2 to 6 carbon atoms, such as ethylene, n-propylene, isopropylene, or butylene; or an alkylene group with 2 to 9 carbon atoms having an oxygen atom of an ether bond in the molecular structure, such as oxyethylene, oxy n-propylene, oxyisopropylene, or oxybutylene. In an embodiment, $R^2$ may be an alkylene group with 2 to 9 carbon atoms having an oxygen atom of an ether bond in the molecular structure, such as oxyethylene, oxy n-propylene, oxyisopropylene, or oxybutylene from the viewpoint of reducing the viscosity of the ink jet composition and further improving the curability of the ink jet composition.

In the above formula (I), the monovalent organic residue with 1 to 11 carbon atoms represented by $R^3$ may be a substituted or unsubstituted linear, branched, or cyclic alkyl group with 1 to 10 carbon atoms or a substituted or unsubstituted aromatic group with 6 to 11 carbon atoms. In some embodiments, $R^3$ is an alkyl group with 1 or 2 carbon atoms, that is, methyl or ethyl, or an aromatic group with 6 to 8 carbon atoms, such as phenyl or benzyl.

When the organic residues are substituted, the substituent may or may not contain one or more carbon atoms. For the substituent containing one or more carbon atoms, the carbon atoms of the substituent are counted in the number of carbon atoms of the organic residue. Examples of the substituent containing one or more carbon atoms include, but are not limited to, carboxy and alkoxy. Examples of the substituent not containing carbon atoms include, but are not limited to, hydroxy and halogens.

Specific examples of the compound of formula (I) include, but are not limited to, 2-vinyloxyethyl (meth)acrylate, 3-vinyloxypropyl (meth)acrylate, 1-methyl vinyloxyethyl (meth)acrylate, 2-vinyloxypropyl (meth)acrylate, 4-vinyloxybutyl (meth)acrylate, 1-methyl vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate. In some embodiments, 2-(2-vinyloxyethoxy)ethyl acrylate is used in view of the ease of balancing the curability and viscosity of the ink jet composition. In the embodiments described herein, 2-(2-vinyloxyethoxy)ethyl acrylate may be abbreviated to VEEA.

The vinyl group-containing (meth)acrylate content may be 7.5% to 40% by mass, for example, 15% to 35% by mass or 20% to 30% by mass, relative to the total mass of the ink jet composition. The use of one or more vinyl group-containing (meth)acrylates in such a proportion tends to reduce the viscosity of the ink jet composition, consequently improving the ejection consistency of the ink jet composition.

1. 1. 2. 2. Multifunctional (Meth)Acrylates

Examples of multifunctional (meth)acrylates include bifunctional (meth)acrylates, such as dipropylene glycol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A ethylene oxide (EO) adduct di(meth)acrylate, bisphenol A propylene oxide (PO) adduct di(meth)acrylate, hydroxypivalic acid neopentyl glycol di(meth)acrylate, and polytetramethylene glycol di(meth)acrylate; and trifunctional or more multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glyceryl propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

In some embodiments, dipropylene glycol diacrylate (DPGDA) is used. Such a multifunctional (meth)acrylate tends to further increase the curability of the ink jet composition and the rub resistance of the coating and reduce the viscosity of the ink jet composition.

The multifunctional (meth)acrylate content is 1.0% to 12% by mass relative to the total mass of the ink jet composition and, in some embodiments, may be 1.5% to 10% by mass, for example, 2.0% to 8.0% by mass. The use of one or more multifunctional (meth)acrylates in such a range tends to further increase the curability and reduce the viscosity.

1. 1. 3. Polymerizable Monomers B

The SP values of polymerizable monomers B are 7.0 $(J/cm^3)^{1/2}$ or less or 8.0 $(J/cm^3)^{1/2}$ or more and, in some embodiments, may be 6.5 $(J/cm^3)^{1/2}$ or less or 8.5 $(J/cm^3)^{1/2}$ or more, or 6.0 $(J/cm^3)^{1/2}$ or less or 9.5 $(J/cm^3)^{1/2}$ or more. The use of at least one polymerizable monomer B with such an SP value tends to reduce the likelihood that the ink jet composition affects material durability.

Polymerizable monomers B can be selected from the above-described monofunctional monomers A1 and multifunctional monomers A2, having an SP value, calculated from Small's equation, of 7.0 $(J/cm^3)^{1/2}$ or less or 8.0 $(J/cm^3)^{1/2}$ or more. In some embodiments, nitrogen-containing monofunctional monomers, particularly acryloylmorpholine, may be selected. Such a polymerizable monomer B tends to further increase the rub resistance and adhesion of the coating and reduce the likelihood that the ink jet composition affects material durability.

The polymerizable monomer B content is 20% by mass or more relative to the total mass of the ink jet composition and may be 30% to 80% by mass, for example, 40% to 75% by mass or 50% to 70% by mass. The ink jet composition containing 20% by mass or more of polymerizable monomers B is less likely to affect material durability. Also, limiting the polymerizable monomer B content to 80% by mass or less tends to further increase the rub resistance and adhesion of the coating and reduce the likelihood that the ink jet composition affects material durability.

1. 1. 4. Polymerizable Monomers C

The SP values of polymerizable monomers C are more than 7.0 $(J/cm^3)^{1/2}$ to less than 8.0 $(J/cm^3)^{1/2}$ and, in some embodiments, may be 7.1 $(J/cm^3)^{1/2}$ to 7.9 $(J/cm^3)^{1/2}$ or 7.2 $(J/cm^3)^{1/2}$ to 7.8 $(J/cm^3)^{1/2}$. The use of at least one polymerizable monomer C with an SP value in such a range tends to increase the adhesion and rub resistance of the coating.

Polymerizable monomers C can be selected from the above-described monofunctional monomers A1 and multifunctional monomers A2, having an SP value, calculated from Small's equation, of more than 7.0 $(J/cm^3)^{1/2}$ to less than 8.0 $(J/cm^3)^{1/2}$. In some embodiments, alicyclic structure-containing monofunctional monomers, particularly isobornyl (meth)acrylate, may be selected. Such a monofunctional monomer C tends to further increase the adhesion, rub resistance, bendability, and anti-blocking property of the coating. The isobornyl (meth)acrylate content is as described above.

The polymerizable monomer C content is 22.5% by mass or less relative to the total mass of the ink jet composition and, in some embodiments, may be 5.0% to 20% by mass, for example, 10% to 17.5% by mass. Limiting the polymerizable monomer C content to 22.5% by mass or less reduces the likelihood that the ink jet composition affects material durability. The use of one or more polymerizable monomers C in an amount of 5.0% by mass or more tends to increase the adhesion and rub resistance of the coating.

The proportion of the polymerizable monomer C content to the polymerizable monomer B content may be 2.0 to 8.0, for example, 2.5 to 7.5 or 3.0 to 7.0. The use of polymerizable monomers B and C in such a proportion tends to increase the adhesion and rub resistance of the coating and reduce the likelihood that the ink jet composition affects material durability.

1. 2. Oligomer

In an embodiment of the present disclosure, the ink jet composition may further contain an oligomer. An oligomer is a compound composed of molecules of one or more polymerizable compounds, containing one or more polymerizable functional groups. The polymerizable compounds mentioned here are not limited to the above-described monofunctional and multifunctional monomers. In the present disclosure, the term oligomer is defined as a compound having a molecular weight of 1000 or more, and the term monomer is defined as a compound having a molecular weight of less than 1000.

Examples of such an oligomer include, but are not limited to, urethane acrylate oligomers containing urethane as the repeating unit, polyester acrylate oligomers containing ester as the repeating unit, and epoxy acrylate oligomers containing epoxy as the repeating unit.

In some embodiments, a urethane acrylate oligomer, for example, an aliphatic urethane acrylate oligomer or an aromatic urethane acrylate oligomer, may be used, particularly an aliphatic urethane acrylate oligomer. When a urethane acrylate oligomer is used, a tetrafunctional or lower functional urethane acrylate oligomer may be selected. In some embodiments, a bifunctional urethane acrylate oligomer may be used. The use of such an oligomer tends to reduce the viscosity of the ink jet composition and increase the curability of the ink jet composition and the adhesion of the coating.

The oligomer content may be 1% to 15% by mass, for example, 1% to 10% by mass or 2% to 7% by mass, relative to the total mass of the ink jet composition. Such an amount of oligomer in the ink jet composition tends to reduce the viscosity of the ink jet composition and increase the curability of the composition and the adhesion of the coating.

1. 3. Polymerization Initiator

The ink jet composition disclosed herein may further contain a polymerization initiator, provided that the polymerization initiator is a photopolymerization initiator producing active species when being irradiated with radiation. Examples of the polymerization initiator include, but are not limited to, acylphosphine oxide-based polymerization initiators, alkylphenone-based polymerization initiators, titanocene-based polymerization initiators, and thioxanthone-based polymerization initiators. In some embodiments, an acylphosphine oxide-based polymerization initiator or a thioxanthone-based polymerization initiator may be used, particularly an acylphosphine oxide-based polymerization initiator. Such a polymerization initiator tends to increase the curability of the composition, particularly the curability in a curing process using light from an ultraviolet light emitting diode (UV-LED). A polymerization initiator may be used independently, or two or more polymerization initiators may be used in combination.

The polymerization initiator content may be 3% to 15% by mass, for example, 5% to 12% by mass or 7% to 10% by mass, relative to the total mass of the ink jet composition. When the polymerization initiator content is in such a range, the polymerization initiator is more likely to dissolve in the ink jet composition and tends to improve the curability of the ink jet composition.

1. 3. 1. Acylphosphine Oxide-Based Polymerization Initiator

Examples of acylphosphine oxide-based polymerization initiators include, but are not limited to, 2,4,6-trimethylbenzoyldiphenylphosphine oxide, bis(2,4,6-trimethylbenzoyl)phenylphosphine oxide, and bis(2,6-dimethoxybenzoyl)-2,4,4-trimethylpentylphosphine oxide.

Commercially available acylphosphine oxide-based polymerization initiators include, but are not limited to, Omnirad 819 (bis(2,4,6-trimethylbenzoyl)phenylphosphine oxide), IRGACURE 1800 (mixture of bis(2,6-dimethoxybenzoyl)-2,4,4-trimethylpentylphosphine oxide and 1-hydroxycyclohexyl phenyl ketone in a mass ratio of 25:75), and SpeedCure TPO (2,4,6-trimethylbenzoyldiphenylphosphine oxide), for example.

The acylphosphine oxide-based polymerization initiator content may be 3% to 15% by mass, for example, 5% to 12% by mass or 7% to 10% by mass, relative to the total mass of the ink jet composition. When the acylphosphine oxide-based polymerization initiator is in such a range, the polymerization initiator is more likely to dissolve in the ink jet composition and tends to improve the curability of the ink jet composition.

1. 3. 2. Thioxanthone-Based Polymerization Initiator

Examples of thioxanthone-based polymerization initiators include, but are not limited to, thioxanthone, diethylthioxanthone, isopropylthioxanthone, and chlorothioxanthone.

Commercially available thioxanthone-based polymerization initiators include, but are not limited to, SpeedCure DETX (2,4-diethylthioxanthene-9-one) and SpeedCure ITX (2-isopropylthioxanthone), both produced by Lambson Group Ltd., and KAYACURE DETX-S (2,4-diethylthioxanthone) produced by Nippon Kayaku Co., Ltd.

1. 4. Polymerization Inhibitor

Examples of polymerization inhibitors include, but are not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds, such as 2,2,6,6-tetramethylpiperidine-1-oxyl, 2,2,6,6-tetramethyl-4-hydroxypiperidine-1-oxyl (LA-7RD), and 2,2,6,6-tetramethylpiperidine-1-oxyl derivatives.

The polymerization inhibitor content may be 0.1% to 0.5% by mass, for example, 0.1% to 0.3% by mass, relative to the total mass of the ink jet composition. The ink jet composition containing a polymerization inhibitor in such a range is more likely to be stored stably.

1. 5. Surfactant

The surfactant may be, but is not limited to, an acetylene glycol-based surfactant, a fluorosurfactant, or a silicone surfactant.

Examples of the acetylene glycol-based surfactant include, but are not limited to, 2,4,7,9-tetramethyl-5-decyne-4,7-diol and its alkylene oxide adducts; and 2,4-dimethyl-5-decyne-4-ol and its alkylene oxide adducts.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxides.

The silicone surfactant may be a polysiloxane compound or a polyester-modified or polyether-modified silicone. Examples of the polyester-modified silicone include BYK-347, BYK-348, BYK-UV 3500, BYK-UV 3510, and BYK-UV 3530 (all produced by BYK Additives & Instruments). The polyether-modified silicone may be BYK-3570 (produced by BYK Additives & Instruments).

The surfactant content may be 0.1% to 1% by mass, for example, 0.2% to 0.8% by mass, relative to the total mass of the ink jet composition. The use of a surfactant in such a range tends to increase the wettability of the ink jet composition.

1. 6. Coloring Material

The ink jet composition disclosed herein may further contain a coloring material. The ink jet composition containing a coloring material can be used as a colored ink composition. The coloring material may be at least either pigment or dye.

Inorganic pigments that can be used include carbon blacks (C.I. (Color Index Generic Name) Pigment Black 7), such as furnace black, lamp black, acetylene black, and channel black; and iron oxide and titanium oxide.

Organic pigments include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

The total coloring material content may be 0.5% to 15% by mass, for example, 1.0% to 10% by mass or 1.5% to 5.0% by mass, relative to the total mass of the ink jet composition but may be appropriately varied depending on the use of the ink jet composition. In an embodiment, the ink jet composition may be a clear ink containing no coloring material or a small amount (e.g., 0.1% by mass or less) of a coloring material to the extent that the coloring material is not intended for coloring.

Examples of the dye include, but are not limited to, acid dyes, such as C.I. Acid Yellows, C.I. Acid Reds, C.I. Acid Blues, C.I. Acid Oranges, C.I. Acid Violets, and C.I. Acid Blacks; basic dyes, such as C.I. Basic Yellows, C.I. Basic Reds, C.I. Basic Blues, C.I. Basic Oranges, C.I. Basic Violets, and C.I. Basic Blacks; direct dyes, such as C.I. Direct Yellows, C.I. Direct Reds, C.I. Direct Blues, C.I. Direct Oranges, C.I. Direct Violets, and C.I. Direct Blacks; reactive dyes, such as C.I. Reactive Yellows, C.I. Reactive Reds, C.I. Reactive Blues, C.I. Reactive Oranges, C.I. Reactive Violets, and C.I. Reactive Blacks; and disperse dyes, such as C.I. Disperse Yellows, C.I. Disperse Reds, C.I. Disperse Blues, C.I. Disperse Oranges, C.I. Disperse Violets, and C.I. Disperse Blacks. Such dyes may be used individually or in combination.

1. 7. Other Constituents

The radiation-curable ink jet composition disclosed herein may optionally contain additives such as a dispersant for pigments or the like.

2. Ink Jet Printing Method

An ink jet method according to an embodiment of the present disclosure includes an ejection step of ejecting the above-described radiation-curable ink jet composition onto a printing medium from an ink jet head using a material with an SP value of 7.0 $(J/cm^3)^{1/2}$ to 8.0 $(J/cm^3)^{1/2}$ in a flow path, and an irradiation step of irradiating the radiation-curable ink jet composition on the printing medium with radiation.

2. 1. Ejection Step

In the ejection step, a heated composition is ejected onto a printing medium from an ink jet head. More specifically, the ink jet composition in a pressure generating chamber of the ink jet head is ejected through nozzles by the operation of a pressure-generating device. Such a way of ejection is also referred to as an ink jet method.

The ink jet head used in the ejection step may be a line head used for line printing or a serial head used for serial printing.

For line printing with a line head, for example, an ink jet head with a width more than or equal to the print width of the printing medium is fixed to an ink jet printing apparatus. While the printing medium is moved in a sub-scanning direction (longitudinal direction of the printing medium, medium transport direction), ink droplets are ejected through the nozzles of the ink jet head in conjunction with the movement of the printing medium, thus printing an image on the printing medium.

For serial printing with a serial head, an ink jet head is mounted on or in a carriage capable of moving across the width of the printing medium. While the carriage is moved in a main scanning direction (lateral or width direction of the printing medium), the ink jet head ejects ink droplets through the nozzles, thus printing an image on the printing medium.

2. 2. Irradiation Step

In the irradiation step, the radiation-curable ink jet composition on the printing medium is irradiated with radiation. On irradiating the ink jet composition with radiation, the monomers start polymerization to cure the composition, thus forming a coating. At this time, the polymerization initiator, if present, produces an active species (initiation species), such as radicals, an acid, or a base. The initiation species promotes the polymerization reaction of the monomers. Additionally, in the presence of a photosensitizer, the photosensitizer absorbs radiation and becomes excited. The excited photosensitizer comes into contact with the polymerization initiator to promote the decomposition of the polymerization initiator, thus further promoting the curing reaction.

The radiation used herein may be ultraviolet light, infrared light, visible light, or X rays. The radiation is applied to the ink jet composition from a radiation source disposed downstream of the ink jet head. The radiation source may be, but is not limited to, an ultraviolet light emitting diode. Use of such a radiation source can reduce the size and cost of the apparatus. The ultraviolet light emitting diode used as the radiation source, which is small, can be incorporated into the ink jet printing apparatus.

For example, the ultraviolet light emitting diode may be attached to the carriage (on both ends of the carriage in the direction parallel to the width of the printing medium and/or on the medium transport direction side of the carriage) on or in which the ink jet head to eject the radiation-curable ink jet composition is mounted. Additionally, the above-described constituents and their proportions of the radiation-curable ink jet composition enable low-energy, rapid curing. The irradiation energy is calculated by multiplying irradiation time by irradiation intensity. Hence, the irradiation time can be reduced, and the printing speed can be increased. Also, the irradiation intensity can be reduced. Thus, the temperature increase of the print or printed object can be reduced, and accordingly, the odor of the cured coating can be reduced.

3. Ink Jet Printing Apparatus

The ink jet printing apparatus disclosed herein includes an ink jet head using a material with an SP value of 7.0 $(J/cm^3)^{1/2}$ to 8.0 $(J/cm^3)^{1/2}$ in a flow path, and the above-described radiation-curable ink jet composition. Additionally, the apparatus may further include a radiation source that applies radiation to the ink jet composition.

The ink jet head uses a material with an SP value of 7.0 $(J/cm^3)^{1/2}$ to 8.0 $(J/cm^3)^{1/2}$ in a flow path. The term "flow path" used herein refers to a channel through which the ink jet composition is delivered within the ink jet head. A portion of the flow path uses a material with an SP value, calculated from Small's equation, of 7.0 $(J/cm^3)^{1/2}$ to 8.0 $(J/cm^3)^{1/2}$. Materials with such an SP value include silicone adhesive that bonds ink jet components together and ethylene propylene diene rubber that forms rubber bushings.

The FIGURE is a perspective view of a serial printer as an example of the ink jet printing apparatus. As depicted in the FIGURE, the serial printer 20 includes a transport section 220 and a printing section 230. The transport section 220 transports a printing medium F fed to the serial printer to the printing section 230 and, after printing, ejects the printing medium outside the serial printer. More specifically, the transport section 220 includes feed rollers that transport the printing medium F fed thereto in the sub-scanning direction T1.

The printing section 230 includes an ink jet head 231 that ejects a composition onto the printing medium F fed from the transport section 220, a radiation source 232 that applies radiation to the composition on the printing medium, a carriage 234 holding the ink jet head 231 and the radiation source 232, and a carriage transfer mechanism 235 that transfers the carriage 234 in the main scanning directions S1 and S2 in which the printing medium F is scanned.

In such a serial printer, the ink jet head 231 has a width smaller than the width of the printing medium and moves for a plurality of passes (multiple passes), thus performing printing. In the serial printer, the carriage 234, transferring the predetermined directions, holds the ink jet head 231 and the radiation source 232, and the head ejects the composition onto the printing medium while being moved by the transfer of the carriage. Thus, printing is performed by two or more passes (multiple passes) of the head. A pass is also referred to as a main scan. Between two passes, a sub-scan is performed to transport the printing medium. Main scans and sub-scans are alternately performed.

In the embodiment illustrated in the FIGURE, the carriage holds the radiation source. However, another type of radiation source not held by the carriage may be used.

The ink jet printing apparatus disclosed herein is not limited to the serial printer and, in an embodiment, may be a line printer.

4. Printed Object

A printed object mentioned herein is a cured product of the radiation-curable ink jet composition on the printing medium. The ink jet composition of the present disclosure is extensible and adhesive. Accordingly, the printed object can be cut out or bent without being cracked or chipped in the coating. Thus, the object printed with the ink jet composition disclosed herein is suitable for advertising signs or the like.

Exemplary materials of the printing medium include, but are not limited to, plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinyl acetal; and glass, paper, metal, and wood. Surface-treated plastics may be used.

EXAMPLES

The subject matter of the present disclosure will be further described in detail with reference to Examples and Comparative Examples. However, the implementation of the concept of the present disclosure is not limited to the following Examples.

1. Preparation of Ink Jet Compositions

Constituents for the individual compositions presented in the Table were placed into a mixing tank, followed by mixing and stirring, and the mixture was filtered through a membrane filter with a pore size of 5 μm. Thus, the compositions of the Examples were prepared. The values of the constituents in the Table are expressed by wt % unless otherwise specified.

TABLE

| | | | | SP Value [(J/cm$^3$)$^{1/2}$] | Tg [° C.] | Example 1 | 2 | 3 | 4 | 5 | 6 |
|---|---|---|---|---|---|---|---|---|---|---|---|
| Dispersion liquid | | | Pigment (PB 15:3) | — | — | 2.0 | 2.0 | 2.0 | 2.0 | 2.0 | 2.0 |
| | | | Dispersant | — | — | 0.5 | 0.5 | 0.5 | 0.5 | 0.5 | 0.5 |
| | | | Base monomer (PEA) | 9.99 | −22 | 3.0 | 3.0 | 3.0 | 3.0 | 3.0 | 3.0 |
| Polymerizable monomer A | Monofunctional monomer A1 | Polymerizable monomer C | IBXA | 7.24 | 94 | 15.0 | 10.0 | 20.0 | | | 15.0 |
| | | | TMCHA | 7.77 | 29 | | | | 15.0 | | |
| | | | TBCHA | 7.78 | 10 | | | | | 15.0 | |
| | | Polymerizable monomer B | PEA | 9.99 | −22 | 21.0 | 26.0 | 18.0 | 19.0 | 19.0 | 19.0 |
| | | | ACMO | 11.55 | 145 | 7.0 | 7.0 | 5.0 | 9.0 | 9.0 | 4.0 |
| | | | MUA | 11.57 | −3 | 6.0 | 6.0 | 6.0 | 6.0 | 6.0 | 6.0 |
| | Multifunctional monomerA2 | | DPGDA | 9.55 | 104 | 4.0 | 4.0 | 2.0 | 4.0 | 4.0 | 6.0 |
| | | | VEEA | 9.41 | 39 | 25.0 | 25.0 | 27.0 | 25.0 | 25.0 | 31.0 |
| Oligomer | | | CN9893 | — | — | 5.0 | 5.0 | 5.0 | 5.0 | 5.0 | 5.0 |
| Polymerization initiator | | | SpeedCure TPO | — | — | 4.0 | 4.0 | 4.0 | 4.0 | 4.0 | 4.0 |
| | | | Omnirad 819 | — | — | 5.0 | 5.0 | 5.0 | 5.0 | 5.0 | 5.0 |
| | | | Speedcure DETX | — | — | 2.0 | 2.0 | 2.0 | 2.0 | 2.0 | 2.0 |
| Surfactant | | | BYK-UV 3500 | — | — | 0.3 | 0.3 | 0.3 | 0.3 | 0.3 | 0.3 |
| Polymerization inhibitor | | | LA-7RD | — | — | 0.02 | 0.02 | 0.02 | 0.02 | 0.02 | 0.02 |
| | | | MEHQ | — | — | 0.18 | 0.18 | 0.18 | 0.18 | 0.18 | 0.18 |
| Total | | | | | | 100.0 | 100.0 | 100.0 | 100.0 | 100.0 | 103.0 |
| Proportion [mass %] of monofunctional monomers A1 to total mass of polymerizable monomers A | | | | | | 60 | 60 | 60 | 60 | 60 | 52 |
| Average SP value [(J/cm$^3$)$^{1/2}$] of polymerizable monomers A weighted by their proportions by mass | | | | | | 9.53 | 9.70 | 9.32 | 9.67 | 9.67 | 9.44 |
| Average glass transition temperature [° C.] of homopolymers of polymerizable monomers A weighted by their proportions by mass | | | | | | 40.37 | 33.21 | 41.80 | 32.46 | 28.94 | 39.54 |
| Evaluation | Unlikelihood of affecting material durability | | | | | A | A | B | A | A | A |
| | Anti-blocking property | | | | | A | B | A | B | B | A |
| | Bendability | | | | | A | A | A | A | A | B |
| | Adhesion | | | | | A | B | A | A | A | A |
| | Rub resistance | | | | | A | A | B | A | A | B |

| | | | | SP Value [(J/cm$^3$)$^{1/2}$] | Tg [° C.] | Example 7 | 8 | 9 | Comparative Example 1 | 2 | 3 |
|---|---|---|---|---|---|---|---|---|---|---|---|
| Dispersion liquid | | | Pigment (PB 15:3) | — | — | 2.0 | 2.0 | 2.0 | 2.0 | 2.0 | 2.0 |
| | | | Dispersant | — | — | 0.5 | 0.5 | 0.5 | 0.5 | 0.5 | 0.5 |
| | | | Base monomer (PEA) | 9.99 | −22 | 3.0 | 3.0 | 3.0 | 3.0 | 3.0 | 3.0 |
| Polymerizable monomer A | Monofunctional monomer A1 | Polymerizable monomer C | IBXA | 7.24 | 94 | 20.0 | 15.0 | 15.0 | 25.0 | | 25.0 |
| | | | TMCHA | 7.77 | 29 | | | | | | 20.0 |
| | | | TBCHA | 7.78 | 10 | | | | | | 18.0 |
| | | Polymerizable monomer B | PEA | 9.99 | −22 | 29.0 | 13.0 | 28.0 | 13.0 | 31.0 | 10.0 |
| | | | ACMO | 11.55 | 145 | 7.0 | 4.0 | | 5.0 | 12.0 | |
| | | | MUA | 11.57 | −3 | 8.0 | 6.0 | 6.0 | 6.0 | 6.0 | |
| | Multifunctional monomerA2 | | DPGDA | 9.55 | 104 | 4.0 | 6.0 | 4.0 | 4.0 | 4.0 | |
| | | | VEEA | 9.41 | 39 | 10.0 | 34.0 | 25.0 | 25.0 | 25.0 | 5.0 |
| Oligomer | | | CN9893 | — | — | 5.0 | 5.0 | 5.0 | 5.0 | 5.0 | 5.0 |
| Polymerization initiator | | | SpeedCure TPO | — | — | 4.0 | 4.0 | 4.0 | 4.0 | 4.0 | 4.0 |
| | | | Omnirad 819 | — | — | 5.0 | 5.0 | 5.0 | 5.0 | 5.0 | 5.0 |
| | | | Speedcure DETX | — | — | 2.0 | 2.0 | 2.0 | 2.0 | 2.0 | 2.0 |
| Surfactant | | | BYK-UV 3500 | — | — | 0.3 | 0.3 | 0.3 | 0.3 | 0.3 | 0.3 |
| Polymerization inhibitor | | | LA-7RD | — | — | 0.02 | 0.02 | 0.02 | 0.02 | 0.02 | 0.02 |
| | | | MEHQ | — | — | 0.18 | 0.18 | 0.18 | 0.18 | 0.18 | 0.18 |
| Total | | | | | | 100.0 | 100.0 | 100.0 | 100.0 | 100.0 | 100.0 |
| Proportion [mass %] of monofunctional monomers A1 to total mass of polymerizable monomers A | | | | | | 79 | 47 | 60 | 60 | 60 | 90 |
| Average SP value [(J/cm$^3$)$^{1/2}$] of polymerizable monomers A weighted by their proportions by mass | | | | | | 9.51 | 9.40 | 9.40 | 9.15 | 10.14 | 8.07 |

TABLE-continued

| | | | | | | | |
|---|---|---|---|---|---|---|---|
| Average glass transition temperature [° C.] of homopolymers of polymerizable monomers A weighted by their proportions by mass | | 36.70 | 44.07 | 25.94 | 50.57 | 29.20 | 37.27 |
| Evaluation | Unlikelihood of affecting material durability | B | A | A | C | A | C |
| | Anti-blocking property | C | A | B | A | B | C |
| | Bendability | A | C | A | C | A | B |
| | Adhesion | A | A | A | A | C | A |
| | Rub resistance | A | A | C | A | A | C |

The abbreviations and materials in the Table are as follows:
Dispersion Liquid
PB 15:3: Pigment blue 15:3
Dispersant: Solsperse 36000 (polymer dispersant produced by Lubrizol Corporation)
Monofunctional Monomers A1
Polymerizable Monomers C
IBXA (isobornyl acrylate, produced by Osaka Organic Chemical Industry Ltd.)
TMCHA (3,3,5-trimethylcyclohexyl acrylate, available as Biscoat #196 (product name) produced by Osaka Organic Chemical Industry Ltd.)
TBCHA (tert-butyl cyclohexanol acrylate, available as SR217 (product name) produced by Sartomer)
Polymerizable Monomers B
PEA (phenoxyethyl acrylate, available as Biscoat #192 (product name) produced by Osaka Organic Chemical Industry Ltd.)
ACMO (acryloylmorpholine, produced by KJ Chemicals Corporation)
MUA (2-(butylcarbamoyloxy)ethyl acrylate, produced by Tokyo Chemical Industry Co., Ltd.)
Multifunctional Monomers A2
Polymerizable Monomers B
VEEA (2-(2-vinyloxyethoxy)ethyl acrylate, produced by Nippon Shokubai Co., Ltd.)
DPGDA (dipropylene glycol diacrylate, available as SR508 (product name) produced by Sartomer)
Oligomer
CN9893 (product name of polyether-based aliphatic urethane acrylate oligomer with two functional groups, produced by Sartomer)
Polymerization Initiators
SpeedCure TPO (product name of 2,4,6-trimethylbenzoyldiphenylphosphine oxide, produced by Lambson Group Ltd.)
Omnirad 819 (product name of bis(2,4,6-trimethylbenzoyl)phenylphosphine oxide, produced by IGM Resins)
SpeedCure DETX (product name of 2,4-diethylthioxanthen-9-one, produced by Lambson Group Ltd.)
Surfactant
BYK-UV 3500 (silicone surfactant, produced by BYK Additives & Instruments)
Polymerization Inhibitors
LA-7RD (product name of 2,2,6,6-tetramethyl-4-hydroxypiperidine-1-oxyl, produced by ADEKA Corporation)
MEHQ (hydroquinone monomethyl ether, available as p-Methoxyphenol (product name) produced by Kanto Chemical Co., Inc.)

2. Evaluation
2. 1. Unlikelihood of Affecting Material Durability

Ethylene propylene diene rubber (EB270N-1-1000-100, produced by Akitsu Industry Co., Ltd., SP value: 7.9 to 8.0), which is a material used in the flow path of the ink jet head, was cut into pieces of 30 mm×30 mm, and 0.2 g of silicone adhesive (KE-4897-W produced by Shin-Etsu Chemical Co., Ltd., SP value: 7.3 to 7.6) was cured under the conditions of 25° C. and 50% RH for 7 days to prepare adhesive test pieces. The adhesive test pieces were each individually immersed in ink jet compositions at 60° C. for 7 days, and the change in the weight of the test pieces before and after the immersion was calculated. The unlikelihood of affecting material durability was evaluated according to the following criteria.

Weight change (%)=[(weight after immersion−weight before immersion)/weight before immersion]×100

Criteria
A: Weight change was less than 20%.
B: Weight change was 20% to less than 40%.
C: Weight change was 40% or more.

2. 2. Anti-Blocking Property

Each radiation-curable ink jet composition was applied onto a polyvinyl chloride film that is a printing medium to a thickness of 12 μm with a bar coater and irradiated with ultraviolet light with an illuminance of 1000 mW/cm$^2$ at a radiation intensity of 250 mJ/cm$^2$ in terms of cumulative energy. The light source was an LED with a peak wavelength at 395 nm. The resulting prints were put one on top of another, with the rear side of the printing medium on the printed side having a coating of another print, and the prints in this state were allowed to stand in an environment of 20° C. to 25° C. and a humidity of 40% RH to 60% RH for 24 hours while a load of 600 g was applied. After being allowed to stand, the prints were visually checked for sticking of coatings or blocking traces, and the anti-blocking property was evaluated according to the following criteria.

Criteria
A: No sticking
B: Coatings were stuck, but no blocking traces
C: Coatings were stuck, and blocking traces were observed.

2. 3. Bending Test

The coatings formed in the anti-blocking test described above were subjected to bending test with a paint film bending tester PI-801 manufactured by Tester Sangyo Co., Ltd. in accordance with JIS K 5600-5-1. The mandrel used in this test had a diameter of 2 mm. The bending test results were evaluated according to the following criteria.

Criteria
A: No cracks by bending at 180° C.
B: No cracks by bending at 130° C., but cracked at 180° C.
C: Cracked by bending at 90° C.

2. 4. Adhesion

The coatings formed in the anti-blocking test were subjected to cross-cut test in accordance with JIS K 5600-5-6. More specifically, the blade of a box cutter was perpendicularly put on the ink coating, and, thus, a 10×10 grid was formed with cut lines spaced 1 mm apart. A 25 mm-wide transparent adhesive tape of about 75 mm in length was stuck over the grid and sufficiently rubbed with a finger so that the ink coating could be seen through the tape. Then, within 5 minutes after sticking the tape, the tape was reliably removed from the coating for 0.5 s to 1.0 s at an angle of about 60°, and the grid was visually observed.

Criteria

A: Less than 10% of the grid was peeled.
B: 10% to less than 35% of the grid was peeled.
C: 35% or more of the grid was peeled.

2. 5. Rub Resistance

The coating formed in the anti-blocking property test was rubbed reciprocally 20 times or until the coating was peeled, with a rubber, with a white cotton cloth (according to JIS L 0803) attached, of a Gakushin-type rubbing tester AB-301 (manufactured by Tester Sangyo Co., Ltd.) at a load of 200 g. The degree of peeling of the ink coating from the printing medium was visually observed, and the rub resistance was evaluated according to the following criteria.

Criteria

A: The load when the stylus come into contact with the surface of the media was 30 mN to less than 35 mN.
B: The load when the stylus come into contact with the surface of the media was 25 mN to less than 30 mN.
C: The load when the stylus come into contact with the surface of the media was 20 mN to less than 25 mN.
D: The load when the stylus come into contact with the surface of the media was less than 20 mN.

3. Evaluation Results

The Table suggests that using polymerizable monomers B and C in predetermined proportions can provide a radiation-curable ink jet composition that has good adhesion, and that is less likely to affect material durability even when used in an ink jet printing apparatus including an ink jet head using a material with an SP value of 7.0 $(J/cm^3)^{1/2}$ to 8.0 $(J/cm^3)^{1/2}$ in a flow path.

What is claimed is:

1. A radiation-curable ink jet composition used in an ink jet printing apparatus including an ink jet head using a material with an SP value of 7.0 $(J/cm^3)^{1/2}$ to 8.0 $(J/cm^3)^{1/2}$ in a flow path, the ink jet composition comprising:
    polymerizable monomers A including at least one polymerizable monomer B with an SP value of 7.0 $(J/cm^3)^{1/2}$ or less or 8.0 $(J/cm^3)^{1/2}$ or more and at least one polymerizable monomer C with an SP value of more than 7.0 $(J/cm^3)^{1/2}$ to less than 8.0 $(J/cm^3)^{1/2}$
        the at least one polymerizable monomer B being in an amount of 20% by mass or more relative to the total mass of the ink jet composition,
        the at least one polymerizable monomer C being in an amount of 5.0% to 22.5% by mass relative to the total mass of the ink jet composition.

2. The radiation-curable ink jet composition according to claim 1, wherein
    the at least one polymerizable monomer B includes a nitrogen-containing monofunctional monomer.

3. The radiation-curable ink jet composition according to claim 2, wherein
    the at least one polymerizable monomer B includes acryloylmorpholine.

4. The radiation-curable ink jet composition according to claim 1, wherein
    the at least one polymerizable monomer C includes an alicyclic structure-containing monofunctional monomer.

5. The radiation-curable ink jet composition according to claim 4, wherein
    the at least polymerizable monomer C includes isobornyl (meth)acrylate, the isobornyl (meth)acrylate being in an amount of 5.0% to 20% by mass relative to the total mass of the ink jet composition.

6. The radiation-curable ink jet composition according to claim 1, wherein
    homopolymers of the polymerizable monomers A have glass transition temperatures whose average weighted by the proportions by mass of the individual polymerizable monomers A is 25° C. to 40° C.

7. The radiation-curable ink jet composition according to claim 1, wherein
    the polymerizable monomers A include at least one monofunctional monomer A1 in a proportion of 50% to 80% by mass relative to the total mass of the polymerizable monomers A.

8. The radiation-curable ink jet composition according to claim 1, wherein
    the polymerizable monomers A include at least one multifunctional monomer A2 including a vinyl group-containing (meth)acrylate represented by the following general formula:

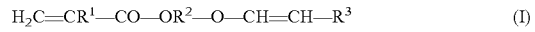

$$H_2C=CR^1-CO-OR^2-O-CH=CH-R^3 \quad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

9. The radiation-curable ink jet composition according to claim 8, wherein
    the at least one multifunctional monomer A2 is in an amount of 20% by mass or more relative to the total mass of the ink jet composition.

10. An ink jet printing apparatus comprising:
    an ink jet head using a material with an SP value of 7.0 $(J/cm^3)^{1/2}$ to 8.0 $(J/cm^3)^{1/2}$ in a flow path; and
    the radiation-curable ink jet composition as set forth in claim 1, the ink jet composition being ejected from the ink jet head.

* * * * *